(12) United States Patent
Kirchner

(10) Patent No.: US 10,457,197 B2
(45) Date of Patent: Oct. 29, 2019

(54) VEHICLE FOR CONVEYING PERSONS AND ORIENTATION AID

(71) Applicant: Bombardier Transportation GmbH, Berlin (DE)

(72) Inventor: Hans-Joachim Kirchner, Berlin (DE)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 15/232,947

(22) Filed: Aug. 10, 2016

(65) Prior Publication Data

US 2017/0043707 A1 Feb. 16, 2017

(30) Foreign Application Priority Data

Aug. 12, 2015 (DE) ......................... 10 2015 113 317

(51) Int. Cl.
*B60Q 1/26* (2006.01)
*G08C 17/02* (2006.01)
*G09B 21/00* (2006.01)

(52) U.S. Cl.
CPC .............. *B60Q 1/26* (2013.01); *G08C 17/02* (2013.01); *G09B 21/008* (2013.01)

(58) Field of Classification Search
CPC ...... B60Q 1/26; G09B 21/001; G09B 21/006; G09B 21/009; G01C 21/3484
See application file for complete search history.

(56) References Cited

U.S. PATENT DOCUMENTS

| 5,838,238 | A | * | 11/1998 | Abita ..................... A61H 3/061 250/DIG. 1 |
| 6,473,704 | B1 | | 10/2002 | Ito et al. |
| 2006/0157562 | A1 | * | 7/2006 | Desjeux ............ G06K 19/0723 235/382 |
| 2008/0222478 | A1 | * | 9/2008 | Tamaki .................... H04L 1/18 714/749 |
| 2010/0176953 | A1 | | 7/2010 | Sherwood et al. |
| 2010/0268462 | A1 | | 10/2010 | Tebbit et al. |
| 2011/0008047 | A1 | * | 1/2011 | Poirrier ............... H04J 14/0221 398/70 |
| 2011/0307172 | A1 | * | 12/2011 | Jadhav ................. G09B 21/001 701/491 |
| 2015/0175179 | A1 | * | 6/2015 | Green ..................... B61L 19/06 246/27 |

FOREIGN PATENT DOCUMENTS

| CH | 697266 B1 | 7/2008 |
| DE | 202004021078 U1 | 10/2006 |
| DE | 102005032528 A1 | 1/2007 |
| EP | 0968694 A1 | 1/2000 |
| FR | 2945635 A1 | 11/2010 |
| FR | 2971353 B1 | 1/2013 |

* cited by examiner

*Primary Examiner* — Curtis B Odom
(74) *Attorney, Agent, or Firm* — The Webb Law Firm

(57) ABSTRACT

A vehicle for conveying passengers includes an interior space for accommodating the passengers, a door area for entering and leaving the interior space, and a sensor arranged at the door area. The sensor is configured to emit an electromagnetic signal in which an individual identification of the door area is encoded.

17 Claims, 2 Drawing Sheets

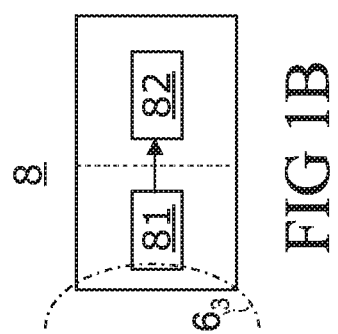

US 10,457,197 B2

VEHICLE FOR CONVEYING PERSONS AND ORIENTATION AID

CROSS-REFERENCE TO RELATED APPLICATION

This application claims priority to German Patent Application No. 10 2015 113 317.2 filed Aug. 12, 2015, the disclosure of which is hereby incorporated in its entirety by reference.

BACKGROUND OF THE INVENTION

Field of the Invention

The present invention relates to a vehicle for conveying persons, more particularly to a rail-borne vehicle or bus, and to a portable orientation aid for passengers of the vehicle, especially for visually impaired and blind persons.

Description of Related Art

Devices which make it easier for blind and visually impaired persons to find their way around in everyday life have long been in use. Examples include tactile markings on paths, and traffic lights and vehicles equipped with acoustic emitters.

The publication CH 697 266 B1 describes an electronic device for providing help on streets, in public spaces and on public transport for users such as blind and visually impaired persons. This device comprises a portable user device with input means for a user to enter information, acoustic and/or tactile output means for issuing information to the user, and radio transmission means on the user side for sending and receiving radio signals. The electronic device also comprises several object devices, which are suitable for installing on an object in a vicinity of the user, each having a storage means for storing information, and an object-associated radio transmission means connected to the storage means for bidirectional radio communication with the user-associated radio transmission means.

The publication FR 2971353 A1 describes a sound amplification device for localising an access door of a public transport vehicle with the aid of a radio wave transmitter. The sound amplification device has a CPU and is connected to an on-board device of the vehicle in order to receive information about the movement status of the vehicle and the opening status of an entrance door of the vehicle. The CPU sends commands to a loudspeaker wherein the commands depend on receiving or not receiving radio waves of a predefined type with radio wave receiver of the sound amplification device and on the information received by the on-board-device.

The publication U.S. Pat. No. 5,838,238 A describes a device which assists those who are visually impaired or handicapped and, in particular, a system for warning blind or visually impaired travelers that they have entered a potentially dangerous area proximal to an edge of boarding platforms of the type typically found in railway and other types of transit systems. An Infrared Integrated Indicating System (IRIIS) includes an array of optical emitters and a portable detector/warning device to be held by a visually handicapped traveler. The emitters create a beam of light which bathes a section of the platform proximal to the platform edge. As the visually handicapped traveler moves into a region of the platform covered by the beam of light, a first indicator, such as sensors in the warning device, is activated and by audio, tactile or other stimuli, alert the visually handicapped traveler of entry into a hazard zone. A second indicator provides additional confirmation to the visually handicapped traveler that doors are open as he or she prepares to board.

The publication FR2945635 A1 describes a positioning system for persons in a building with a plurality of transponders at fixed positions and a portable device for persons, which by way of the calculated position of a user issues acoustic signals for guiding the user.

In addition, orientation or assistance systems are widely used for supporting motor vehicle drivers, and also in the field of leisure, e.g. during jogging.

The publication DE 20 2004 021 078 U1 thus describes a device also suitable for older, visually impaired or blind users for the integrated control and use of information systems and/or entertainment systems with a portable part unit having an acoustic output device, a first transmitter and/or receiver device, a power supply device and a control device. The device can also be used as a portable navigation system with speech output when hiking or cross-country skiing. As the user of the device is provided with the information acoustically, his/her attention is not impaired by reading optical displays.

The publication DE 10 2005 032 528 A1 describes so-called manoeuvring assistance systems, more particularly navigation systems and parking assistance systems, and a method of delivering assisting information signals to a user, wherein the assisting information signals are delivered to the user as haptic information signals by means of a haptic information system that can be connected to the manoeuvring assistance.

A drawback of all the solutions known to date is that although they provide blind and visually impaired persons with general orientation help, the finding of a door of a waiting vehicle by blind or visually impaired persons is, however, only inadequately supported.

The device described in the U.S. Pat. No. 5,838,238 A warns a blind or visually impaired passenger of hazardous areas and informs him/her that he/she is standing in front of open doors of a vehicle. However, the passenger must find his/her own way to an open door. Without other assistance, this can be very difficult and correspondingly time-consuming for a blind or visually impaired person.

SUMMARY OF THE INVENTION

An aim of the present invention is to make it easier for blind and visually impaired persons to easily and reliably find a door, more particularly a door that is ready for boarding of a vehicle for conveying passengers.

This aim is achieved by the vehicle disclosed herein.

According to an embodiment of the vehicle for conveying passengers, the vehicle includes an interior space for accommodating the passengers, a door area for entering and leaving the interior space, and an emitter arranged in and/or at the door area, and configured to emit an electromagnetic signal, in which an individual identification of the door area is encoded. The emitter is typically an electro-magnetic emitter in the radiofrequency range.

The vehicle may be a bus or a rail-borne vehicle used in local, regional and/or long-distance public transport, e.g. a tram, an underground train, a local train, or a long-distance train.

The term "door area" as used herein, is intended to described an area of the vehicle which adjoins a door of the vehicle leading to an interior space, i.e. a passenger space door, and can include the door. The door can also be a double door. The door area is typically an area immediately adjacent to the door, with a distance to the door of typically up to a maximum of one meter, even more typically of maximally 50 cm.

Typically, the emitter is arranged, in a side view from outside onto the door area, in the longitudinal direction of the vehicle and/or in a view onto the vehicle from above, at least centrally in the longitudinal direction of the vehicle. The arrangement facilitates the localisation and finding of the door by means of a portable orientation aid.

For example, the emitter can be arranged, in a side view from outside of the door area, centrally in the longitudinal direction of the vehicle and in an upper section of the door area, e.g. above the door. In this way signal attenuation through other persons located between the portable orientation aid and the door is at least partially reduced.

Typically the emitter is arranged externally on the vehicle and/or in an outwardly open opening or recess of an outer panelling of the vehicle. This ensures low-loss emission of the electromagnetic signal even when the door area is closed off (closed doors).

To increase the reliability, the emitter is typically connected to a control device of the vehicle which controls the sensor. The control device may deactivate the emitter while the vehicle is travelling and/or shortly before travelling when the door area already closed or closing and/or may cause the sensor to emit the electro-magnetic signal when the vehicle has stopped (during a stop).

According to an embodiment of a portable orientation aid, the portable orientation aid includes an output unit, and a receiving- and control unit connected to the output unit. The receiving- and control unit is configured to detect an electromagnetic signal of a vehicle, to decode an individual identification of a door area of a vehicle encoded in the electromagnetic signal, and, after decoding the individual identification, to cause the output unit to emit a signal that indicates the door area to a person who is waiting for the vehicle and is equipped with the portable orientation aid (hereinafter also referred to as a passenger).

When a passenger equipped with the portable orientation aid is in the vicinity, e.g. on a platform, of a waiting vehicle, and the emitter emits a signal encoding the individual identification of a door area when the vehicle is ready for boarding, the portable orientation aid can indicate the door area to the passenger. This is typically done by way of acoustic signals and/or tactilely perceived signals, more particularly vibrations, emitted by the output unit of the portable orientation aid, for example a resepctive converter unit.

In this way the door area can also be pointed out to a blind or visually impaired passenger who can start searching for the door area thereafter. In this way the search time can be reduced.

As the individual identification of the door area is encoded in the signal, the portable orientation aid can, if appropriate information is stored, e.g. in the form of a database in a storage area of the portable orientation aid, also provide the passenger with further information about the waiting vehicle, e.g. which vehicle it is and/or which route the vehicle serves. This means that a blind or visually impaired passenger may only begin searching for a door if it involves a door of a vehicle that goes to a destination or interchange station that he/she wants to reach. In this way it can be prevented that a blind or visually impaired persons accidentally boards a vehicle that does not take him/her to the required destination or interchange facility, e.g. a bus serving an unwanted route. Additionally, this allows further reducing the search time.

Typically the receiving- and control unit is configured to determine a direction to the door area through an evaluation of the electromagnetic emitter signal detected with an appropriate receiver at two or more locations. This may be achieved, for example, by determining a gradient or a difference in the strength of the electromagnetic signal, e.g. an electrical field strength. This only requires a typically small movement of the portable orientation aid, e.g. a movement of the portable orientation aid with the hand or a slow walking movement of the user of the portable orientation aid.

This makes it possible for the blind or visually impaired user to reliably reach the door with the help of the orientation aid in the shortest time, possibly even in the shortest way.

In comparison to an orientation aid for boarding based on acoustic signals emitted from the door area, increased reliability and greater convenience for visually impaired and blind persons can achieved for whom orientation based on acoustic signals from door areas in the at least periodically loud environment (station announcements, other vehicles arriving/departing, noisy other passengers) can be very difficult.

As the emission of acoustic signals by the open door area can be dispensed with, other passengers or people living close by are not, or if so, at least only slightly disturbed.

Typically, the output unit of the portable orientation aid can emit acoustic and/or tactilely perceivable signals which indicate to the user that he/she is approaching and/or moving away from the emitter. For example, the portable orientation aid may emit a signal sequence in which the interval between signals becomes shorter when approaching the emitter and thus the door, and becomes longer on moving away from the door.

In another embodiment, the portable orientation aid increases a volume and/or a basic frequency of an emitted sound signal as the distance to the emitter and therefore the door decreases.

According to an embodiment, the portable orientation aid alternatively or additionally provides verbal information about the direction to be taken and/or maintained.

In order to disturb other passengers as little as possible, the portable orientation aid may emit acoustic signals to the user via headphones.

Typically, the receiving- and control unit is further configured to determine a distance to the emitter and therefore to the door area by evaluating the electromagnetic signal detected by the receiver. This can done, for example, by determining the strength of the electro-magnetic signal (hereinafter also referred to as the signal strength), e.g. the electrical field strength.

In one embodiment, the emitter type and/or its transmission power and/or further emission characteristics of the emitter are also encoded in the emitted electromagnetic signal. From the locally measured strength of the electromagnetic signal and the transmission power, the receiving- and control unit may calculate the respective distance to the emitter.

In a further embodiment, the door areas of the vehicles are equipped with emitters of the same, possibly standardised transmission power or at least with a low power variation of less than 5% or even less than 2% from each other. To calculate the distance, the receiving- and control unit in this example of embodiment may assume a given transmission power.

The typically repeatedly, e.g. at regular intervals, calculated distance to the emitter can additionally or alternatively be used to determine the gradient or the difference of the signal strength of the emitter used for determining the signals to be emitted by the output device.

Determining the distance to the emitter also allows to precisely inform the user when he/she has arrived directly in front of the door area. In this situation the portable orientation aid can emit, for example, a continuous signal.

The blind or visually impaired user then reliably knows that now he/she a step is to expected. Accordingly, the risk of an injury and/or the boarding time can be reduced.

Additionally, it may be encoded in the electromagnetic signal of the emitter whether the door area can be opened or whether it is already open.

When the user has arrived directly in front of the door area and the door area is still open for boarding, the user can be informed of this by the portable orientation aid.

After building up a typically bidirectional connection between the portable orientation aid and the door area, opening of the door area can also be initiated by the portable orientation aid, e.g. when the user has arrived in the vicinity of the door area.

For example, the emitter can be provided by a transmitter-receiver module of the door area. The emitter may be provided by a Bluetooth module or a WLAN module of the door area and the receiving and control unit of the portable orientation aid may have a corresponding Bluetooth module or a WLAN module.

However, it is also possible for the emitter in the door area and the corresponding receiver of the portable orientation aid to use other frequencies or frequency bands, e.g. at 27 MHz or in the terahertz range.

Although even higher frequency signals, e.g. infrared signals, may be used in principle, this may, in comparison with the radiofrequency range, result in a considerably reduced reliability. This is because the risk of signal attenuation or even signal interruption through additional persons is much higher in the infrared range. Additionally, infrared receiving elements often only operate adequately well if they are aligned to the infrared emitter. This can make operation by blind or visually impaired persons more difficult.

The calculation of the distance between the portable orientation aid and emitters and/or the comparison of the measured signal strength of emitters of different door areas, which can be distinguished by the portable orientation aid on the encoded individual identification in the emitted electromagnetic signal, also allows to determine and guide the user to the nearest door area of typically several door areas of the vehicle.

Typically the sensors assigned to the door areas are provided by so-called Bluetooth hotspots, i.e. a radio cell based on Bluetooth technology with which a Bluetooth module of the receiving- and control unit of the portable orientation aid can communicate. In this embodiment the Bluetooth module of the receiving- and control unit will typically automatically set up a connection to the nearest Bluetooth hotspot (and thus to the nearest door area) of the vehicle.

The Bluetooth hotspot can belong to one of the power classes 1 to 3. However this can depend on the type of vehicle. The power class 3 (1 mW transmission power) may be sufficient for buses and the typically small areas of bus stops, but for trains with several carriages a higher power class is often desirable.

For trains with several carriages (passenger carriages), a carriage identification may additionally be encoded in the electromagnetic signal. The decoding and passing on of this information to the user makes it possible for him/her to decide whether to board the carriage in front of him/her, or another carriage for which he/she has booked a seat, for example. If the portable orientation aid also has a speech recognition module, a blind or visually impaired user can even request the portable orientation aid through speech input to guide him/her to a door area that is as close as possible to his/her seat.

The portable orientation aid is typically a personal digital assistant (PDA, i.e. a compact, portable computer, e.g. a so-called tablet computer) or a smartphone typically combining the functions of a PDA and a mobile phone.

PDAs and smartphones are widely used and typically already have a Bluetooth module and/or a WLAN module. Via application software loadable into a storage area (in particular a mobile app, in the following alsoe referred to as app, i.e. an application software for mobile devices and mobile operating systems), devices already available to the user can be equipped with the desired functions of the orientation aid. During operation, the application software may access a dataflow of the Bluetooth module (or WLAN module), decode the individual identification of the door area therein and control an acoustic output device (e.g. an electroacoustic converter that is internal or connected via a headset) and/or a vibration motor of the PDA or smartphone.

Modern smartphones typically also have further sensors such as, for example movement and/or acceleration sensors and/or even a GPS module (Global Positioning System) to which the application software may have access during operation and with the aid of which the accuracy and/or reliability of determining the distance between the emitter and the portable orientation aid and/or determining the direction in which emitter of the door area is located seen from the portable orientation aid and the user, respectively, may be increased.

With the described vehicle(s) and the portable orientation aid, a passenger guidance system can be built up which considerably facilitates boarding, in particular for blind and visually impaired persons.

Optionally, the passenger guidance system may include a server hosting a database with the individual identifications of door areas and/or other vehicle-specific information such as timetables and anticipated delays.

In one embodiment, the portable orientation aid can be connected to the server e.g. via a WLAN module or a mobile phone standard-compatible module, e.g. a UMTS module or an LTE module (the requirements and the data rates are very low; accordingly mobile modules based on an older mobile phone standard can also be used) in order to call up the individual identification(s) of the door area(s) of the vehicle(s) and optionally also further information such as vehicle timetables. This makes it possible for the user to call up the relevant current vehicle fleet data if desired.

In a further embodiment, the vehicle, typically a computer of the vehicle, can be connected to the server. In this embodiment, the additional information can be made available to the user via the door area emitter.

The passenger guidance system can, however, also be operated without a server.

Typically, vehicle-based Bluetooth hotspots are used for the passenger guidance system, and smartphones are used as the portable orientation aid(s).

On the one hand, the visually impaired or blind passengers do not have to acquire special, possibly expensive, hardware. On the other hand, the prospect of global standardisation is particularly good for smartphones used as portable orientation aids, which facilitates a solution that crosses national boundaries.

The above-described forms of embodiment can be combined with each other in any way. Those skilled in the art will recognize additional features and advantages upon reading the following detailed description, and upon viewing the accompanying drawings.

BRIEF DESCRIPTION OF THE DRAWINGS

The attached drawings illustrate embodiments and together with the description serve to explain the principles of the invention. The elements of the drawings are shown relative to each other and are not necessarily to scale.

The same reference numbers denote similar components.

FIG. 1B shows a schematic view of a portable orientation aid according to an embodiment.

DESCRIPTION OF THE INVENTION

Figure 1A:
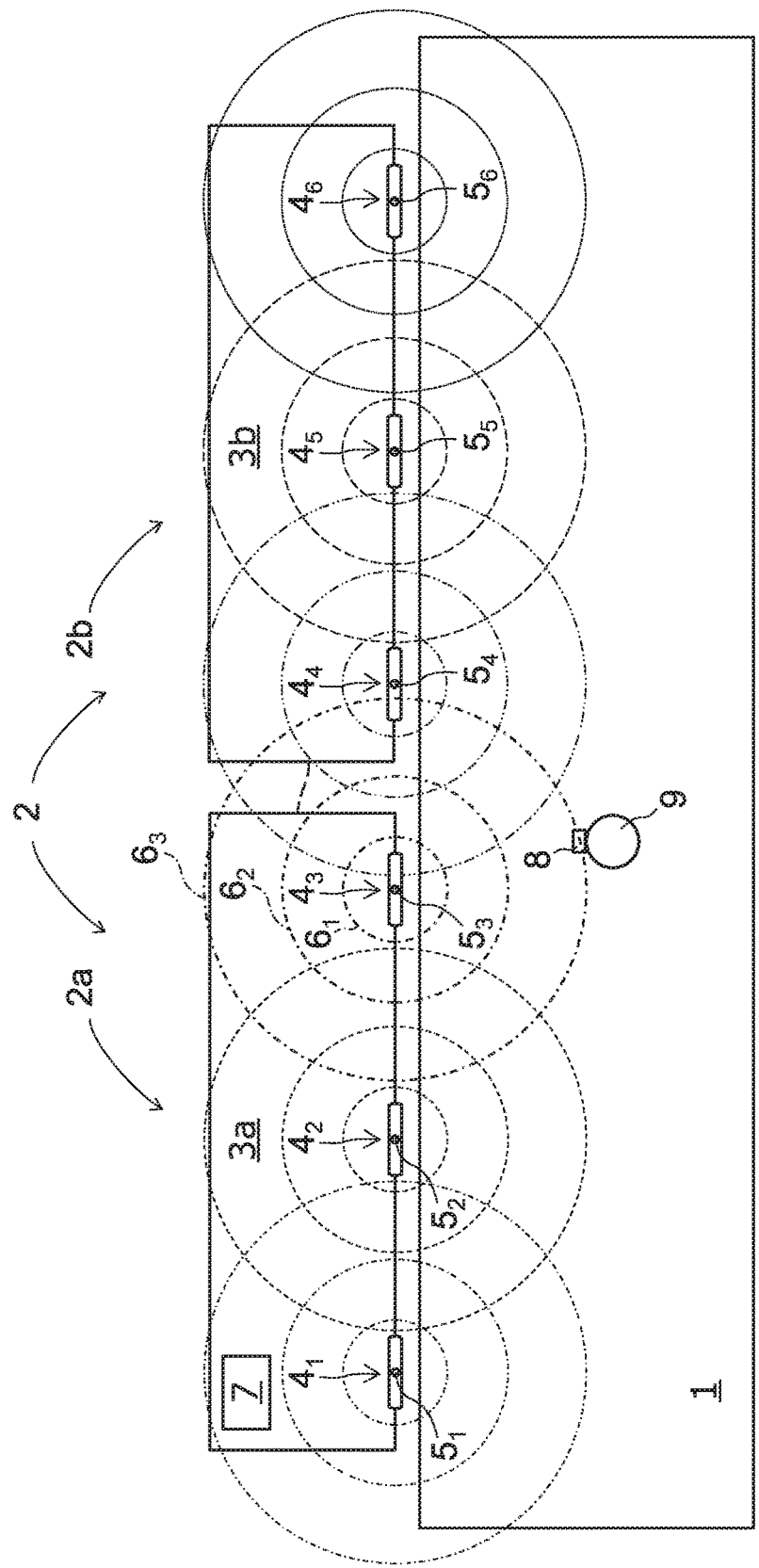
FIG. 1A shows a schematic top view of a vehicle for conveying people and a waiting area in which a passenger with a portable orientation aid is waiting according to an embodiment.

FIG. 1A shows a schematic top view of a vehicle 2 for conveying people which stops in front of a waiting area 1, e.g. a platform, in order to allow passengers to board or alight.

In the examplary embodiment shown in FIG. 1A, a passenger train has two examplary carriages 2a, 2b each having an an interior space 3a, 3b for accommodating passengers. The inner spaces 3a, 3b can each be entered and exited via three respective examplary door areas $4_1$ to $4_6$.

In each door area $4_1$ to $4_6$, an emitter $5_1$-$5_6$ is arranged which can emit an electro-magnetic signal in which an individual identification of the emitter $5_1$-$5_6$ and thus of the associated door area $4_1$-$4_6$ is encoded.

As the passenger train in FIG. 1A is ready for boarding, the emitters $5_1$-$5_6$ emit electromagnetic signals with their own individual identification. In FIG. 1A, the emitted electromagnetic signals are represented by respective dashed circles or dash-dotted circles. The circles of a line type arranged concentrically around an emitter $5_1$-$5_6$ may correspond to a curve of equal signal strength which decrease with increasing distance from the respective emitter $5_1$-$5_6$. For reasons of clarity, in FIG. 1A only the circles symbolising the electromagnetic signal sent out by the emitter $5_3$ are provided with reference signs $6_1$ to $6_3$.

At the waiting area 1, a visually impaired or blind person 9 having a portable orientation aid 8 is waiting. For the sake of clarity, the illustration of other persons typically present in the waiting area 1 or in the train 2 has been dispensed with. The portable orientation aid 8 is shown in more detail in FIG. 1B.

The portable orientation aid 8 has a receiving- and control unit 81 which can detect the electromagnetic signals $6_3$ of the emitter $5_1$-$5_6$ of the vehicle 2 and can decode the individual identification, encoded in the electromagnetic signals $6_3$, of the door areas $4_1$ to $4_6$ of the vehicle 2. In the examplary embodiment, the portable orientation aid 8 will typically choose and decode, respectively, the identification of the door $4_3$ nearest to the orientation aid 8, as the signal strength of the signal $6_3$ of the emitter $4_3$ is strongest at the location of the orientation aid 8 and is therefore typically selected by the portable orientation aid 8.

The receiving- and control unit 81 is connected to an output unit 82. The receiving- and control unit 81 may cause the output unit 82 to emit a signal which points out to the passenger (potentially) waiting for the vehicle the (nearest) door area $4_3$ that is ready for boarding.

Typically, the emitters $5_1$-$5_6$ are (provided by) Bluetooth hotspot, and the receiving- and control unit 81 has a Bluetooth-compatible receiving unit, typically a Bluetooth module that can build up a bidirectional connection with the Bluetooth hotspots $5_1$-$5_6$.

In an embodiment, each door area $4_1$-$4_6$ of the vehicle is equipped with a Bluetooth hotspot $5_1$-$5_6$ which has its own identification which is specifically encoded for the corresponding door area($4_1$-$4_6$).

The transmission power of the Bluetooth hotspots $5_1$-$5_6$ may be identical, except for small tolerances of a maximum of a few percent. This allows simple and reliable determination of the distance between the orientation aid 8 and the Bluetooth hotspot $5_1$-$5_6$ by means of measuring a local signal strength and model assumptions relating to the course of the signal strength.

Typically, each Bluetooth hotspot $5_1$-$5_6$ is arranged centrally over the assigned door area $4_1$-$4_6$. This makes it possible to guide the passenger centrally to the selected door area $4_1$-4.

When the doors or door areas $4_1$-$4_6$ are clear and the vehicle 2 is at a standstill, a signal is emitted by the Bluetooth hotspots $5_1$-$5_6$ which can be received by the Bluetooth-compatible receiving unit of the portable orientation aid 8.

If clearance of the doors or door areas $4_1$-$4_6$ is cancelled, the emission of the signals of the Bluetooth hotspots $5_1$-$5_6$ is typically deactivated.

The portable orientation aid 8 is typically a PDA or a smartphone. For the sake of simplicity, the portable orientation aid 8 is further explained below with reference to a smartphone as the orientation aid.

Typically, a special app is installed on the smartphone 8. The app may record and evaluate the electromagnetic field strengths of the emitting Bluetooth hotspots $5_1$-$5_6$ in order to inform the waiting passenger 9 of one of the cleared door areas $4_1$-$4_6$, typically the closest one $4_3$ of the door areas $4_1$-$4_6$, and to guide him/her thereto.

Thus, a visually impaired or blind carrier 9 of the smartphone 8 can, by way of either acoustic and/or vibration signals, be pointed in the direction of cleared door areas $4_1$-$4_6$.

In a similar manner to parking assistance systems in the automotive sector, the visually impaired person 9 may be informed of the decrease in the distance to the nearest door area $4_3$ by a shortening of a signal sequence.

In order to provide the described function as an orientation aid, the app may measure the field strengths of the transmission signal of the hotspots $5_1$-$5_6$ in a first phase.

In a second phase, the app may determine and select the door area $4_3$ or Bluetooth hotspots $5_3$ with the highest field strength at the current location (e.g. the starting point) of the visually impaired person 9.

In a third phase, the attention of the visually impaired person 9 may be drawn to the selected door area $4_3$, typically through the emission of appropriate signal(s). Then, the visually impaired person 9 may set off on the way to the selected door area $4_3$.

In a fourth phase, acoustic and/or vibrating signals may be emitted which correspond to the signal strength of the selected Bluetooth hotspot $5_3$ locally measured by the smartphone 8. For example, a signal sequence with shortening signal intervals can be emitted for an increasing signal strength (during approaching the selected Bluetooth hotspot $5_3$), whereas with decreasing signal strength the signal intervals may become longer.

In a fifth phase on reaching the selected door area $4_3$, a continuous signal may be emitted by the smartphone 8.

In a sixth phase, in the event of deactivation of the door clearance by a driver, typically via a control device 7 of the vehicle 2 connected with the emitters $5_1$-$5_6$, the emission of the signal by the smartphone 8 may be deactivated.

However, the vehicle 2 can also be an autonomous vehicle.

In this embodiment, the control device 7 may fully monitor the door areas $4_1$-$4_6$ and their emitters $5_1$-$5_6$ and, for example, deactivate the emitters $5_1$-$5_6$ in a state of a closed or closing door area(s) $4_1$-$4_6$ as well as when the vehicle 2 is in motion. When the vehicle 2 stops, in a state of open or opening door area(s) $4_1$-$4_6$ the control device 7 may cause the emitters $5_1$-$5_6$ to emit the respective electromagnetic signals.

Typically, Bluetooth signals emitted by devices of other passengers and passers-by will be ignored by the smartphone 8 during the phases 1 to 6.

The design of the signal to be emitted by the smartphone 8 may be defined and accordingly implemented on the basis of the specifications of or as agreed with disability organisations.

Further, the app may be configured so that it is automatically activated when the smartphone 8 is switched on.

The smartphone 8 can be worn on the body of the visually impaired person 9 with aid of commercially available accessories. For example, sports armbands ensure a good transmission of the vibration signal to the body, so that the device does not have to be held in the hands.

If the smartphone 8 uses acoustic signals for guidance, the acoustic signals may be emitted via an in-ear head set to one ear. In this way, the acoustic signal can be reliably transmitted to the visually impaired person 9 without disturbing other people.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

LIST OF REFERENCE NUMBERS

1 Platform, waiting area
2, 2*a*, 2*b* Vehicle, carriage
3*a*, 3*b* Inner space
$4_1$-$4_6$ Door area
$5_1$-$5_6$ Electromagnetic emitter
$6_1$-$6_3$ Isoline (identical output curve)
7 Control device
8 Portable orientation aid (mobile phone, PDA)
9 Person

The invention claimed is:

1. A vehicle for conveying passengers, the vehicle comprising:
an interior space for accommodating the passengers;
a plurality of door areas for entering and leaving the interior space;
an emitter arranged at each door area, the emitter configured to emit an electromagnetic signal, in which an individual identification of the door area is encoded, wherein the individual identification of each door area is specifically encoded for the corresponding door area, wherein the electromagnetic signal also includes information regarding which route the vehicle serves.

2. The vehicle according to claim 1, wherein the emitter is arranged centrally in the door area when viewed from above.

3. The vehicle according to claim 1, wherein the emitter is an electromagnetic emitter in radiofrequency range, a Bluetooth emitter, or a WLAN emitter.

4. The vehicle according to claim 1, wherein a vehicle identification is encoded in the electromagnetic signal, wherein an opening status of the door area is encoded in the electromagnetic signal, and wherein the vehicle has several carriages and a carriage identification is encoded in the electromagnetic signal.

5. The vehicle according to claim 1, wherein the transmission powers of the emitters deviate from each other by less than 5%.

6. The vehicle according to claim 1, wherein the vehicle is a bus or a rail-borne vehicle.

7. The vehicle according to claim 1, wherein an emitter type of the emitter is encoded in the electromagnetic signal or a transmission power of the emitter is encoded in the electromagnetic signal.

8. The vehicle according to claim 1, wherein a transmission power of the emitter is also encoded in the electromagnetic signal.

9. A portable orientation aid comprising:
an output unit; and
a receiving and control unit connected to the output unit and configured to detect an electromagnetic signal of a vehicle, to decode an individual identification, which is encoded in the electromagnetic signal, of a door area of the vehicle, and after decoding of the individual identification, to cause the output unit to emit a signal that indicates the door area to a person waiting for the vehicle, wherein the receiving and control unit is configured to receive the electromagnetic signal from at least one emitter, wherein the emitter is deactivated when the door area is closed or closing, deactivated while the vehicle is in motion, emits the electromagnetic signal when the door area is open or opening, or emits the electromagnetic signal when the vehicle has stopped,
wherein the receiving and control unit is configured to determine a distance or a direction to the door area by evaluating the electromagnetic signal, wherein evaluating the electromagnetic signal comprises determining at least one of a gradient of a strength of the electromagnetic signal and a difference in the strength of the electromagnetic signal when the portable orientation aid is moved, wherein the vehicle has several door areas in each of which an emitter is arranged, which are configured to emit a respective electromagnetic signal, in which an individual identification of the door area is encoded, and wherein the individual identification of each door area is specifically encoded for the corresponding door area.

10. The portable orientation aid according to claim 9, wherein the output unit is configured to emit the signal as an acoustic signal or as a vibration signal.

11. The portable orientation aid according to claim 9, wherein the receiving and control unit is configured to determine the nearest door area of several door areas of the vehicle.

12. The portable orientation aid according to claim 9, wherein the receiving and control unit has a Bluetooth module or a WLAN module.

13. The portable orientation aid according to claim 9, wherein the portable orientation aid further comprises a personal digital assistant or a smartphone comprising a sensor for the electromagnetic signal of the vehicle and an application program configured to access a data flow of the sensor and to decode the individual identification of the door area from the data flow.

14. A passenger guidance system comprising:
a vehicle comprising:
an interior space for accommodating the passengers;
a plurality of door areas for entering and leaving the interior space; and
an emitter arranged at each door area, and configured to emit an electromagnetic signal, in which an individual identification of the door area is encoded, wherein the individual identification of each door area is specifically encoded for the corresponding door area;
a control device which is connected to the emitter and is configured to deactivate the emitter when the door area is closed or closing, to deactivate the emitter while the vehicle is in motion, to cause the emitter to emit the electromagnetic signal when the door area is open or opening, or to cause the emitter to emit the electromagnetic signal when the vehicle has stopped; and
a portable orientation aid comprising:
an output unit; and
a receiving and control unit connected to the output unit, and configured to detect the electromagnetic signal, to decode the individual identification encoded in the electromagnetic signal, and, after decoding of the individual identification, to cause the output unit to emit a signal that indicates the door area to a person waiting for the vehicle,
wherein the receiving and control unit is configured to determine the nearest door area of several door areas of the vehicle, wherein determining the nearest door area comprises determining at least one of a gradient of a strength of the electromagnetic signal and a difference in the strength of the electromagnetic signal when the portable orientation aid is moved relative to the vehicle.

15. The passenger guidance system according to claim 14, wherein the emitter is an electromagnetic emitter in radiofrequency range, a Bluetooth emitter, or a WLAN emitter.

16. The passenger guidance system according to claim 14, wherein the vehicle has several door areas in each of which an emitter is arranged, which is configured to emit a respective electromagnetic signal, in which an individual identification of the door area is encoded, and wherein transmission powers of the emitters deviate from each other by less than 5%.

17. The passenger guidance system according to claim 14, wherein the receiving and control unit comprises a Bluetooth module or a WLAN module for determining the gradient of the strength of the electromagnetic signal and/or the difference in the strength of the electromagnetic signal.

\* \* \* \* \*